UNITED STATES PATENT OFFICE 2,199,389

NITRO-SALICYLIDENE COMPOUNDS

Edgar C. Britton and Clarence L. Moyle, Midland, Mich., assignors to The Dow Chemical Company, Midland, Mich., a corporation of Michigan No Drawing. Application June 17, 1937,
Serial No. 148,734

5 Claims. (Cl. 260—622)

This invention relates to nitro and dinitro-salicylidene compounds having the formula:

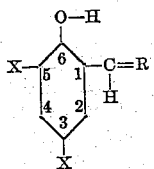

wherein one X is a nitro group, the other X is hydrogen or a nitro group, and R is an organic residue containing a double bond in conjugated relationship to that existing between R and the side-chain carbon atom attached to the benzene nucleus. For example, 3-nitro-salicylidene acetophenone,

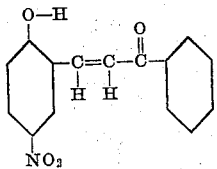

and 9-(3,5-dinitro-salicylidene)-fluorene,

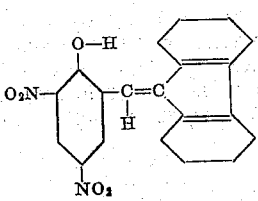

are members of our new class of compounds.

The activity of the hydroxyl group in phenols is in some manner modified for insecticidal and bactericidal purposes by the presence in the compound of substituent groups having conjugated double bonds.

One method of preparing compounds of this type consists in condensing 3-nitro-, 5-nitro-, or 3,5-dinitro-salicylaldehyde with a cyclo-alkadiene, a cyclo-alkanone, or other compound containing an active methylene group, or with a methyl ketone, whereby one mole of water is eliminated for each mole of the aldehyde entering into the reaction. Another method consists in condensing salicylaldehyde with a compound of one of the types just enumerated, and thereafter nitrating the product. Specific examples of compounds to be reacted with salicylaldehyde or a nitro-salicylaldehyde according to the invention are cyclopentadiene, fluorene, indene, diethyl malonate, n-butyl-alpha-gamma-diketo-delta-isopropylidene-valerate ethyl aceto-acetate, mesityl oxide, cyclopentanone, cyclohexanone, acetone, acetophenone, p-phenoxy acetophenone, methyl benzyl ketone, benzal acetone, pinacolone, etc. All of these compounds contain either a methyl group connected to a carbonyl group or an active methylene group, which is capable of condensing with the aldehyde radical with the elimination of water.

The following examples describe the process we have employed in preparing some of our new compounds:

Example 1

10.6 grams (0.05 mol) of 3,5-dinitro-salicylaldehyde was dissolved in 175 milliliters of 45 per cent ethyl alcohol containing 5.1 grams of sodium hydroxide. To the solution was added an equivalent amount (5.0 grams, 0.05 mol) of pinacolone, the latter being added all at once while the mixture was held at a temperature of about 4° C. This temperature was maintained for about 24 hours after which the mixture was acidified with dilute hydrochloric acid. A chocolate colored solid material was precipitated, filtered, washed with water, and dried at 40° C. The product weighed 10.6 grams and represented a yield of 72.1 per cent of the theoretical amount of 3,5-dinitro-salicylidene-alpha-pinacolone. It had a melting point of 138° to 140° C. and a nitrogen content of 9.35 per cent as compared with the theoretical value of 9.53 per cent for this compound. The formula is

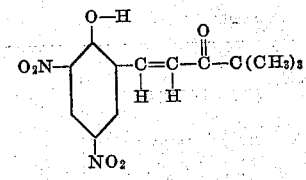

Example 2

In a manner similar to that described above, 10.6 grams of 3,5-dinitro-salicylaldehyde was dissolved in a dilute aqueous alcoholic solution of sodium hydroxide and was treated with an equivalent amount (4.9 grams) of cyclohexanone at a temperature between about 35° and 40° C. After being held at this temperature for about 24 hours the mixture was acidified and the yellow-brown precipitate was washed and dried as described in the foregoing example. It was found to melt in the range from 84° to 89° C. and had a nitrogen content of 9.97 per cent as compared with the theoretical value of 9.69 per cent for 3,5-dinitro-salicylidene-2'-cyclohexanone. The formula is

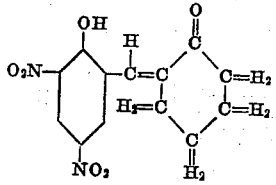

*Example 3*

In a similar manner to that described in the foregoing examples, 0.05 mol of 3,5-dinitro-salicylaldehyde was reacted with 0.05 mol of acetophenone. The reaction product had a yellow color and melted in the range from 182° to 186° C. This product contained 8.98 per cent nitrogen as compared with the theoretical value for 3,5-dinitro-salicylidene-acetophenone of 8.92 per cent. The formula for this compound is

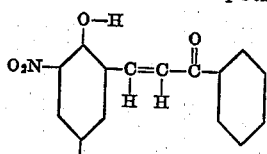

*Example 4*

A technical grade of mononitro-salicylaldehyde containing some 3-nitro- and some 5-nitro-salicylaldehyde was reacted in an analogous manner with para-chloro-acetophenone. The yellow product melted with decomposition at 197° C. and contained 4.93 per cent nitrogen. The theoretical nitrogen content of mononitro-salicylidene-para-chloro-acetophenone is 4.62 per cent.

The following table contains the pertinent data relative to the new compounds whose preparation has been described in the foregoing examples, as well as other new compounds produced by reacting a nitro- or dinitro-salicylaldehyde with methyl ketones or with compounds containing active methylene groups.

The following table contains the pertinent data relative to the new compounds whose preparation has been described in the foregoing examples, as well as other new compounds produced by reacting a nitro- or dinitro-salicylaldehyde with methyl ketones or with compounds containing active methylene groups.

and described contain a conjugated double bond system in the side-chain. These compounds are capable of being reduced to form 2-hydroxy-3-nitro-5-nitro, or -3,5-dinitro-benzyl derivatives. Our new compounds and their reduction products are of interest as insecticidal agents and as intermediates in the preparation of dyes.

Other modes of applying the principle of our invention may be employed instead of those explained, change being made as regards the compounds herein disclosed, provided the compounds stated by any of the following claims be obtained.

We therefore particularly point out and distinctly claim as our invention:

1. A nitrosalicylidene compound having the formula

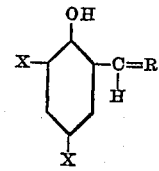

wherein one X is a nitro group, the other X is a member of the class consisting of hydrogen and the nitro group, and R is a radical of a compound selected from the class consisting of hydrocarbons and esters containing an active methylene group, and alpha-methyl ketones; the said radical R being obtained by removing from said compound two reactive hydrogens from the single carbon atom in the characterizing group consisting of one of the said methylene and alpha-methyl groups.

2. A dinitrosalicylidene compound having the formula

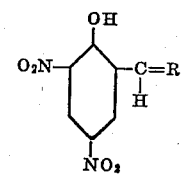

where R is a radical of a compound selected from the class consisting of hydrocarbons and esters containing an active methylene group, and alpha-methyl ketones; the said radical R being obtained by removing from said compound two reactive hydrogens from the single carbon atom in

*Table*

| Reactants | | Product | | | Nitrogen | |
|---|---|---|---|---|---|---|
| Salicylaldehyde derivative | Other reactant | Name | Color | Melting point | Calculated | Found |
| x-Mono-nitro- | Acetophenone | x-Nitro-salicylidene acetophenone | Yellow | 165° C | 5.21 | 5.32 |
| x-Mono-nitro- | p-Chloro-acetophenone | x-Nitro-salicylidene-p-chloroacetophenone | do | 197 dec | 4.62 | 4.93 |
| 3,5-dinitro- | Diethyl malonate | 3,5-dinitro-salicylidene-diethyl malonate | Orange | Oil | 7.91 | |
| 3,5-dinitro- | n-Butyl alpha,gamma-diketo-delta-iso-propylidene-valerate. | n-Butyl alpha,gamma-diketo-beta-(3,5-dinitrosalicylidene)-delta-isopropylidene-valerate. | Red brown | do | 7.14 | 7.24 |
| 3,5-dinitro- | Pinacolone | 3,5-dinitro-salicylidene-alpha pinacolone | Chocolate | 138-140 | 9.53 | 9.35 |
| 3,5-dinitro- | Cyclohexanone | 3,5-dinitro-salicylidene-2'-cyclohexanone | Yellow-brown | 84-89 | 9.69 | 9.97 |
| 3,5-dinitro- | Acetophenone | 3,5-dinitro-salicylidene-acetophenone | Yellow | 182-186 | 8.92 | 8.98 |

Additional compounds of the type which we have prepared include 3,5-dinitro-salicylidene benzylidene acetone; di-(3,5-dinitro-salicylidene)-acetone; 9-(3,5-dinitro-salicylidene)-fluorene; and 3,5-dinitro-salicylidene-cyclopentadiene.

All of the compounds which we have prepared the characterizing group consisting of one of the said methylene and alpha-methyl groups.

3. 3,5-dinitro-salicylidene-alpha-pinacolone.
4. 3,5-dinitro-salicylidene-2'-cyclohexanone.
5. 3,5-dinitro-salicylidene-acetophenone.

EDGAR C. BRITTON.
CLARENCE L. MOYLE.